Dec. 12, 1967  J. BOURLIER  3,357,738
AUTOMOBILE TOP
Filed Oct. 11, 1965  3 Sheets-Sheet 1

JEAN BOURLIER
INVENTOR.

BY
*Marvin S. Blodgett*

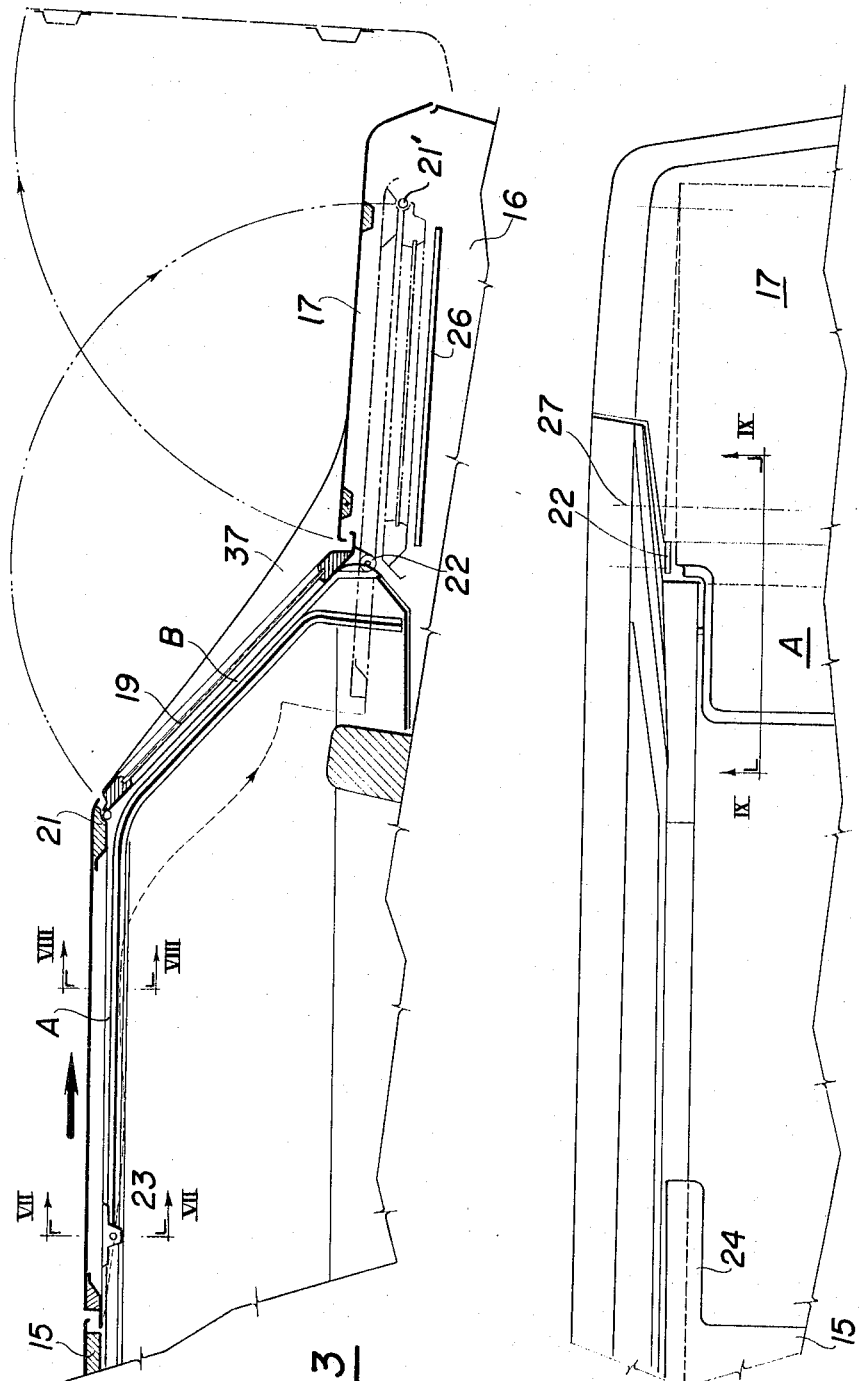

United States Patent Office 3,357,738
Patented Dec. 12, 1967

3,357,738
AUTOMOBILE TOP
Jean Bourlier, 14 Allee Georges Braque,
Fresnes, France
Filed Oct. 11, 1965, Ser. No. 494,399
2 Claims. (Cl. 296—137)

ABSTRACT OF THE DISCLOSURE

The invention has to do with an automobile rigid roof top construction wherein the top can be stored in the trunk of the automobile.

---

This invention relates to an automobile top and, more particularly, to apparatus arranged to permit conversion of an automobile from a covered top to a convertible.

In the construction of automobiles, it has been the usual practice to produce an automobile with a convertible top made of canvas or the like which folds into a rear position in the automobile. Such convertible automobiles, however, have had a number of drawbacks, not the least of which is the fact that the canvas is loose, is apt to leak, and makes a considerable amount of noise when the automobile is moving along the road. In addition, in the wintertime, it is difficult to keep an automobile having such a flexible convertible top warm because of the number of openings available for leakage of warm air from the interior of the car. These and other difficulties which have been experienced in the past with the prior art devices have been obviated in a novel manner by the present invention.

It is, therefore, an outstanding object of the invention to provide an automobile top which, in erected position, is as rigid as the roof in a conventional solid top automobile, and yet which may be retracted readily.

Another object of this invention is the provision of an automobile top which, in erected condition, is capable of being thoroughly and adequately sealed against the entrance of rain or the leakage of warm air from the interior of the car.

A further object of the present invention is the provision of an automobile top made of rigid sections which may be stored in the trunk of the automobile without detracting to any great extent from the available storage space in the trunk.

It is another object of the instant invention to provide an automobile top which may be retracted to convert the automobile into a convertible and which may be retracted by the occupant substantially from the interior of the automobile without getting out.

With these and other objects in view, as will be apparent to those skilled in the art, the invention resides in the combination of parts set forth in the specification and covered by the claims appended hereto.

Figure 1:
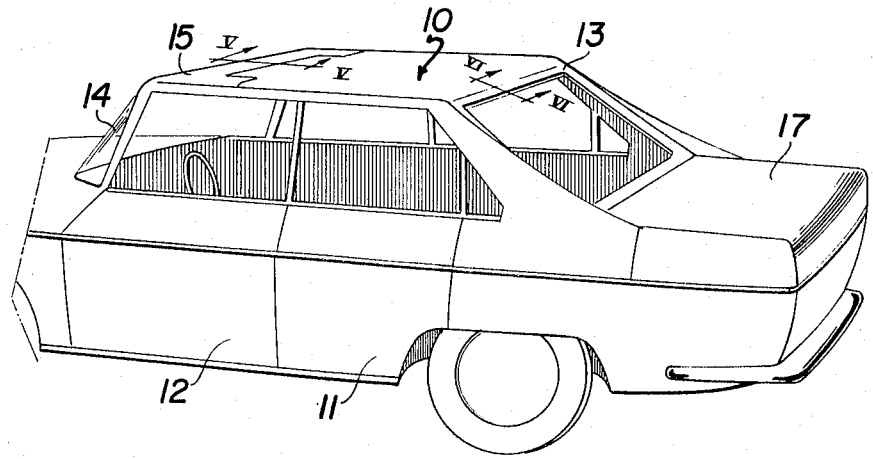
Figure 2:
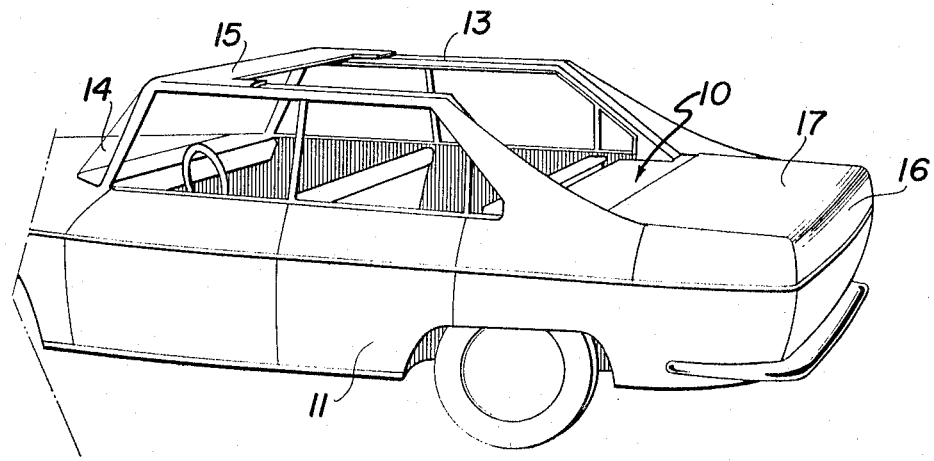
Figure 5:
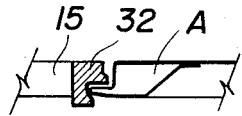
Figure 6:
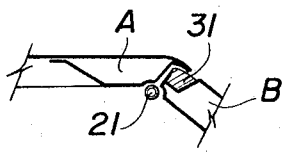
Figure 7:
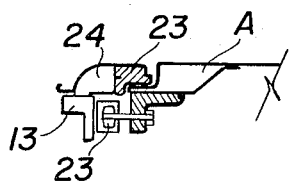
Figure 8:
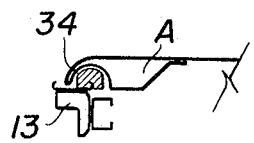
Figure 9:
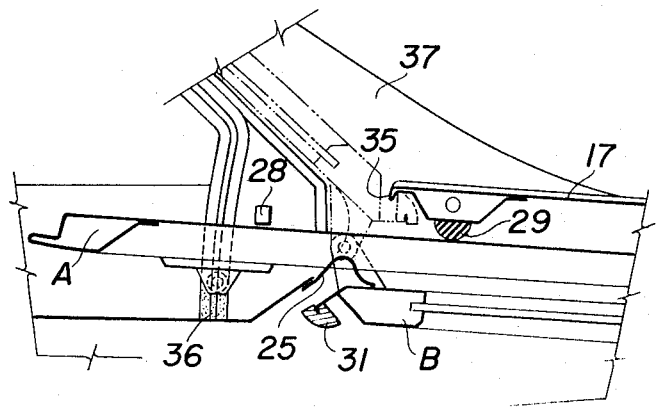
Figure 10:
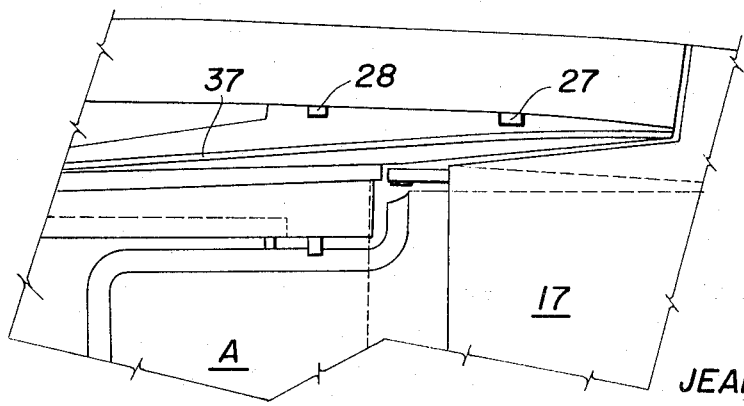

The character of the invention, however, may be best understood by reference to one of its structural forms, as illustrated by the accompanying drawings in which:

FIG. 1 is a perspective view of an automobile top embodying the principles of the present invention and shown in normal condition, FIG. 2 is a perspective view of the automobile top in retracted position, FIG. 3 is a vertical sectional view through the automobile top in erected position, FIG. 4 is a plan view of the automobile top in retracted position, FIG. 5 is a vertical section of a portion of the apparatus taken on the line V—V of FIG. 1, FIG. 6 is a vertical sectional view of a portion of the apparatus taken on the line VI—VI of FIG. 1, FIG. 7 is a vertical sectional view of the apparatus taken on the line VII—VII of FIG. 3, FIG. 8 is a vertical sectional view of the apparatus taken on the line VIII—VIII of FIG. 3, FIG. 9 is a sectional view of the apparatus in retracted position taken on the line IX—IX of FIG. 4, and FIG. 10 is a plan view of the apparatus shown in FIG. 9.

Referring first to FIGS. 1 and 2, wherein are best shown the general features of the invention, the automobile top, indicated generally by the reference numeral 10, is shown as having sides 12 and 13 with horizontal upper edges. The front of the automobile is provided with a windshield 14, which terminates in its upper edge in a front bar 15. The automobile top 10 has a roof section A and a rear window section B. The frames of these two sections are made of sheet steel and are installed between the upper edges of the two sides of the automobile. The rear window section B consists of a metal frame which is slightly trapezoidal in shape carrying a flat glass 19. The height of this glass depends on its angle of inclination and also the general height of the framework. The roof section A is such as to fit into the upper space of the trunk 16 and extends as far forward as the rear seat of the body of the automobile. In order to maintain a minimum amount of crowding in the trunk 16, the three sections, that is to say, the roof section A, the rear window section B, and the trunk cover 17, are made as thin as practical. No problem is experienced by rain water falling onto the floor surfaces of the trunk, since these can be ribbed or grooved to provide for drainage and since they are inclined in a longitudinal direction so that water will run off to one end or the other. In any case, the automobile never finds itself on a completely horizontal road, since the road has an inclination for drainage.

Both the roof section A and the rear window section B are linked together by means of a hinge 21 which is slightly spaced from the interior surface of the sections in such a way that they may be folded against one another. These two sections A and B also have fastenings to the general framework of the chassis of the automobile. The rear window section B is fastened to the framework by two pivots 22 placed at the ends of the lower edge of the section. The horizontal axis of these pivots is spaced laterally away from the section because of the alignment of the inside of the section B. In this manner, the clearance adjusts itself once section B has been swung into the trunk and this permits the necessary space for the thickness of the section A when it is placed between section B and the trunk cover 17, as is shown in dotted outline in FIG. 3. The transverse distance between the two pivots 22 must be greater than the floor space required by section A, so as not to interfere with its sliding into its retracted position within the trunk.

The section A has its front portion provided with two movable fasteners 23 placed at the two side edges and under the outside covering of this section. These fasteners are formed as rollers which slide in deep grooves in the top edges of the sides 12 and 13; the rollers slide in this groove during the displacement of the roof section A. The grooves in the sides 12 and 13 must be strictly parallel to each other and oppose each other symmetrically of the longitudinal axis of the chassis of the automobile. Short extensions 24 of the bar 15 embrace the roof section A but remain behind during its travel to the retracted position.

In accordance with this invention, the rear trunk cover 17 has its hinge located at the extreme rear of the automobile 11. As shown in FIG. 3, section 26 is provided in the trunk 16 and adapted to protect the rear window against damage from the baggage in the trunk when the two sections are in retracted position.

The operation of the invention will now be readily understood, in view of the above description. To retract the top, the roof section A is pushed manually toward the rear of the vehicle in the direction of the arrow in FIG. 3. This operation of pushing section A causes the section B to pivot into the rear trunk. The section A momentarily finishes its travel when the rollers 23 reach the angle in the roof 21. At that time, the hinge is in the dotted position 21' in FIG. 3. The bumper 29 on the underside of the cover 17 (see FIG. 9) holds all of the parts pressed downwardly in retracted position.

To return the automobile 11 to its conventional erected condition, the trunk 17 is again opened. The section A is released at the sides of the rear uprights of the trunk 16 by means of a pushbutton forming part of the latch 28 (see FIG. 10). The section A is raised automatically by release springs up to the angle of the rail. From this position section A is displaced manually forwardly from either inside or the outside of the vehicle. It finds its original place assembled to the top front bar 15 and is locked in place. This movement carries the rear window section B forwardly also into place and the locking of the forward end of the roof section A against the bar 15 holds the whole assembly in place. Then, the cover 17 is returned to its normal position.

The present invention uses various methods of sealing which are brought about by use of proper clearances and flexible joints, such as the joint 31 on the front edge of the rear window section B, and the joint 32 on the rear surface of the bar 15 where it connects with the roof section A. A similar rainproof joint 33 is associated with the side 13 of the automobile (see FIG. 7). Similarly, a joint 34 is associated with the side connection of the roof section A with the side 13 of the automobile. The joint between the rear window section B and the other elements of the invention is particularly well shown in FIGS. 9 and 10. A flange 35 on the front edge of the cover 17 engages the seal 31 on the bottom edge of the rear window section B. Also shown is a flexible strip 25 as well as the point of automatic bolting by the latching 28 of the section A in its retracted position and the point of unbolting externally.

FIG. 9 shows the rejector spring 36 which can be formed in the grooved rail of the side. The rear mounting of the support terminates at its back or rear stop by a slight breakaway 37 and this is concealed by the front side of the car while the sealing of the side mountings of the rear window takes place with the rear mountings of the compartment.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to be secured by Letters Patent is:

1. An automobile top, comprising
   (a) spaced parallel sides having horizontal upper edge portions and rearwardly-located inclined upper edge portions,
   (b) grooves formed in the sides along the said horizontal upper edge portions,
   (c) a trunk having a trunk cover hingedly connected to the trunk at the rear thereof to swing upwardly,
   (d) a roof section having elements slidable in the grooves and normally extending between the sides at the horizontal upper edge portions,
   (e) a rear window section hingedly connected for movement about a swing axis adjacent the lower end of the inclined upper edge portions and normally lying between these edge portions,
   the rear window section being hingedly connected to the roof section, so that, on occasion, the window section and the roof section can occupy the trunk together in folded relationship.

2. An automobile top as recited in claim 1, wherein sealing means is provided between the adjacent edges of the roof section, the rear window section, and the sides of the automobile to prevent the entrance of rain.

References Cited

UNITED STATES PATENTS

| | | | |
|---|---|---|---|
| 1,861,520 | 6/1932 | Arnold | 312—290 X |
| 2,013,314 | 9/1933 | Metz | 296—107 |
| 2,782,070 | 2/1957 | Chaban | 296—107 |
| 2,785,922 | 3/1957 | Chika | 296—107 |
| 3,262,714 | 7/1966 | Langone | 312—290 X |
| 3,271,067 | 9/1966 | Rollman | 296—116 |

BENJAMIN HERSH, *Primary Examiner.*

MILTON BUCHLER, *Examiner.*

C. C. PARSONS, *Assistant Examiner.*